(12) United States Patent
Hill et al.

(10) Patent No.: US 6,581,618 B2
(45) Date of Patent: Jun. 24, 2003

(54) SHALLOW DEPTH, LOW PRESSURE GAS STORAGE FACILITIES AND RELATED METHODS OF USE

(75) Inventors: Ross K. Hill, Houston, TX (US); Paul J. Grimes, Katy, TX (US)

(73) Assignee: Canatxx Energy, L.L.C., Houston, TX (US)

( * ) Notice: Subject to any disclaimer, the term of this patent is extended or adjusted under 35 U.S.C. 154(b) by 0 days.

(21) Appl. No.: 09/865,405

(22) Filed: May 25, 2001

(65) Prior Publication Data

US 2002/0174895 A1 Nov. 28, 2002

(51) Int. Cl.$^7$ ................................................. F17D 1/08
(52) U.S. Cl. ........................... 137/1; 137/236.1; 62/260
(58) Field of Search .............................. 137/236.1, 266, 137/256; 62/260

(56) References Cited

U.S. PATENT DOCUMENTS 3,848,427 A * 11/1974 Loofbourow ........ 137/236.1 X
3,986,339 A * 10/1976 Janelid ............................. 62/45

* cited by examiner

Primary Examiner—Kevin Lee
(74) Attorney, Agent, or Firm—The Matthews Firm (57) ABSTRACT

A shallow depth, low pressure gas storage facility(s) and related methods of use are disclosed for purposes relating to a supply of gas in a gas pipeline and a supply of gas to a user. The shallows depth, low pressure gas storage facility(s) of the present invention have characteristics of high deliverability of injection and withdrawal over a wide pressure range.

56 Claims, 9 Drawing Sheets

SHALLOW DEPTH, LOW PRESSURE GAS STORAGE FACILITIES AND RELATED METHODS OF USE

TECHNICAL FIELD

The present invention relates generally to shallow depth and low pressure gas facilities and related methods of use to balance pipeline systems, supply customers, maximize gas storage and the like during periods of operations of fluctuating demand and supply of gas and normal operations.

BACKGROUND ART

Natural Gas, also known as methane, is a colorless, odorless, fuel that burns cleaner than many other traditional fossil fuels. As used herein, the term "gas" means and includes any gas, including natural gas. The term "diverted," "pump," "pumped," "pumping," "compress," "compressing," "compressed," and the like shall mean channeling, compressing, and diverting. As used herein, the term "line" or "lines" shall mean and include pipes, lines, channels, and the like. It is one of the most popular forms of energy today. It is used for heating, cooling, production of electricity and it finds many uses in industry. Increasingly, natural gas is being used in combination with other fuels to improve their environmental performance and decrease pollution.

Natural gas is most commonly produced by drilling into the Earth's crust. A well or bore-hole is drilled into pockets of natural gas that have been trapped below the surface of the Earth. The natural gas is then compressed or piped to the Earth's surface. Once the gas is brought to the surface, it is refined to remove impurities, like water, other gasses, and sand.

Then it is transmitted through large pipelines that span the continent and the world. In fact, natural gas has become a very important commodity.

To begin with, natural gas must be purchased by some entity. Factories and electric power plants may get gas directly from the pipeline using arrangements made through a marketer, supplier or producer. Residential and smaller businesses generally buy gas from a local distribution company or utility. Further, as discussed above, just like any other commodity, natural gas must be produced, sold and shipped to its end users. However, unlike other commodities, natural gas cannot be stored by the customer in a warehouse until it is utilized. Because of its gaseous nature and volatility, one of the most economically viable manners of storing natural gas is in specialized underground warehouses called natural gas storage fields. These storage fields consist of underground caverns, hollowed out salt domes, depleted natural gas and oil fields, or in some cases water-filled domes.

Underground storage, in common usage, is gas transferred from the reservoir of discovery to other reservoirs, usually closer to market areas, where it is stored until needed to meet market demand. Natural gas is stored in underground reservoirs primarily to ensure the capability of the gas industry to meet seasonal fluctuations in demand. Underground storage supplements the industry's production and delivery systems, allowing supply reliability during periods of heavy gas demand by residential and commercial consumers for space heating. Prior art storage facilities have utilized high pressure storage of natural gas to meet these demands.

These storage facilities/fields act as a buffer between the pipeline and the distribution system of the natural gas. Storage allows distribution companies to serve their customers more reliably by withdrawing more gas from storage to meet customer demands during peak use periods. It also allows the sale of fixed quantities of natural gas on the spot market during off-peak periods. Having local storage of gas also reduces the time necessary for a delivery system to respond to increased gas demand. Storage also allows continuous service, even when production or pipeline transportation services are interrupted. However, the time required to withdraw gas and the time required to re-fill these storage facilities is a source of great time, expense and danger to suppliers, consumers and the like.

For example, there are well more than 400 underground storage sites in 27 states across the United States and Canada. Together, these sites can hold upwards of 3, quads of natural gas, ready to be withdrawn at any time. (A quad is an abbreviation for a quadrillion (1,000,000,000,000,000) Btu. For natural gas, roughly equivalent to one trillion (1,000,000,000,000) cubic feet, or 1 Tcf.) Despite these high numbers, storage capacity is always increasing in order to accommodate increased gas usage and improve reliability. However, the underground storage of today is drastically limited in its operational uses and abilities.

The three principal types of underground storage sites used in the United States today are: (1) depleted reservoirs in oil and/or gas fields, (2) aquifers, and (3) salt formations. Each type has its own physical characteristics (porosity, permeability, retention capability) and economics (site preparation costs, deliverability rates, cycling capability), which govern its suitability to particular applications. As used herein, the term gas storage facility means and refers to any of the three principal types of underground storage sites, i.e. depleted reservoirs, aquifers, and salt formations.

Most existing gas storage in the United States is held in depleted natural gas or oil fields located close to consumption centers. Conversion of a field from production to storage duty takes advantage of existing wells, gathering systems, and pipeline connections. The geology and producing characteristics of a depleted field are also well known. However, choices of storage field location and performance are limited by the inventory of depleted fields in any region.

The reservoir rock of an underground storage cavern in which natural gas is normally stored consists of porous sandstone and limestone. It is quite common that these formations can contain 30% or more pore space by volume. In common cases, the gas is pressurized and injected into the storage reservoir as desired. Further, as desired, the injected natural gas may be produced from the storage reservoir when needed. Accordingly, the art field is in search of a method of utilizing depleted field storage facilities to obtain an utmost benefit.

In some areas natural aquifers have been converted to gas storage reservoirs. An aquifer is suitable for gas storage if the water-bearing sedimentary rock formation is overlaid with an impermeable cap rock. While the geology of aquifers is similar to depleted production fields, their use in gas storage usually requires base (cushion) gas and greater monitoring of withdrawal and injection performance. Deliverability rates of aquifers have been enhanced by the presence of an active water drive. However, the use of aquifers as natural gas storage is, like depleted fields, limited by the presence of an aquifer. Accordingly, the art field is in search of a method of utilizing aquifer storage facilities to obtain an utmost benefit.

Salt formation storage facilities provide very high withdrawal and injection rates compared with their working gas capacity. Base gas requirements are relatively low. To date, the large majority of salt cavern storage facilities have been developed in salt dome formations located in the Gulf Coast States. Salt caverns leached from bedded salt formations in Northeastern, Midwestern, and Western States are also being developed to take advantage of the high volume and flexible operations possible with a cavern facility. The ability to perform several withdrawal and injection cycles each year has made salt formation facilities very popular in recent years. Accordingly, the art field is in search of a method of utilizing salt formation storage facilities to obtain an utmost benefit.

Additionally, storage facilities are classified as seasonal supply reservoirs (depleted gas/oil fields and aquifers for the most part) and high-deliverability sites (mostly salt cavern reservoirs). Seasonal supply sites are designed to be filled during the 214-day nonheating season (April through October) and drawn down during the 151-day heating season (November through March). High-deliverability sites are situated to provide a rapid drawdown (or rebuilding) of inventory to respond to such needs as volatile peaking demands, emergency backup, and/or system load balancing. However, prior art high-deliverability sites are drawn down in 20 days and refilled in 40 days, a relatively large period of time. Accordingly, the art field is in search of a method of utilizing a high-deliverability natural gas storage facility that may be cycled in about ten days. In this context, a cycle is the process of taking the gas cavern from minimum fill to maximum fill and back to minimum fill.

High deliverability may be achieved in a depleted oil or gas reservoir if the reservoir rock has high porosity and permeability (allowing a rapid flow of gas), and the reservoir has sufficient base gas pressure and a sufficient number of wells to maximize withdrawal. Additionally, it would be desirable to be able to refill a reservoir in a reasonably short time. Accordingly, salt cavern storage is ideal for high deliverability, as the entire cavern is one large pore. On average, salt storage facilities can withdraw their gas in about 20 days versus 71 days for aquifers and 64 days for all depleted oil or gas reservoirs. However, the time needed for re-fill is nearly twice that of drawing the natural gas.

Underground storage in depleted gas/oil fields is used when gas can be injected into reservoirs with suitable pore space, permeability, and retention characteristics. All oil and gas reservoirs share similar characteristics in that they are composed of rock with enough porosity so that hydrocarbons can accumulate in the pores in the rock, and they have a less permeable layer of rock above the hydrocarbon-bearing stratum. The hydrocarbon accumulation in the porous rock is pressurized by the weight of hundreds or thousands of feet of rock on top of the reservoir. When a well hole penetrates the impermeable cap layer of rock, the hydrocarbon under pressure is exposed to the much lower atmospheric pressure, and gas can flow into and out of the well.

Depleted oil and gas reservoirs are the most commonly used underground storage sites because of their wide availability. The depleted reservoirs use the pressure of the stored gas and, in some cases, water infiltration pressure to drive withdrawal operations. Cycling is relatively low, and daily deliverability rates are dependent on the degree of rock porosity and permeability, although the facilities are usually designed for one injection and withdrawal cycle per year. Accordingly, the art field is in search of a method by which the cycling may be increased.

Daily deliverability rates from depleted fields vary widely because of differences in the surface facilities (such as compressors), base gas levels, and the fluid flow characteristics of each reservoir. Retention capability, which is the degree to which stored gas is held within the reservoir area, however, is highest of the three principal types of underground storage.

In order to use an abandoned gas reservoir for storage, one or more of the wells used for extraction are typically used to inject gas. As with extraction, the more porous the rock, the rate of injection may be greater. As pressure builds up in the reservoir, the rate of injection slows down (pushing the gas in against higher pressure requires more force). Similarly, when the reservoir is at peak pressure, the rate of extraction is greater than at minimum pressure. Accordingly, the art field is in search of a method that does not encounter the difficulties of slow fill and slow draw.

The factors that determine whether a gas reservoir will make a good storage reservoir are both geographic and geologic. The greater the porosity of the rock, the faster the rates of injection and withdrawal. In some cases, where the reservoir rock is tight or of low porosity, then some form of stimulation of the reservoir may also be performed. This would include various methods to introduce cracks into the reservoir rock, thus increasing the opportunities for the hydrocarbon to flow towards the well hole.

The size of the reservoir (the thickness of the gas-bearing rock stratum and the extent to which the stratum is covered by cap rock) is another factor. Location is also a factor. If the reservoir is not close to existing pipelines or market areas and distribution lines, then greater expense will be incurred to establish connecting pipelines and less utility maybe derived. Accordingly, the art filed is in search of a method that utilizes reservoirs to obtain an utmost performance.

An aquifer storage site is a water-only reservoir conditioned to hold natural gas. Such sites are commonly used as storage reservoirs only when depleted gas or oil reservoirs are not available. Aquifers have been developed exclusively in market areas. In general, aquifer storage is more expensive to develop and maintain than depleted gas or oil reservoir storage.

Aquifer storage deliverability during the heating season is designed around specific customer requirements. These requirements may be for deliveries over a set period of time, for instance, 20, 60, or 120 days. The overall facility design reflects these combined requirements. These requirements also delimit the degree of cycling, that is, the number of times total working levels may be depleted and replenished during a heating season, that may occur at an aquifer site. The sustained delivery rate cannot exceed design limits. Otherwise, unlike depleted oil and gas reservoir storage where cushion gas can be tapped when needed, tapping cushion gas in an aquifer storage site can have an adverse effect upon reservoir performance. Accordingly, the art field is in search of a method of utilizing an aquifer to obtain an utmost benefit.

Salt formations have several properties that make them ideal for storing natural gas. A salt cavern is virtually impermeable to gas and once formed, a salt reservoir's walls have the structural strength of steel. Thus, gas cannot easily escape the large hollowed-out shape that forms a salt storage cavern.

There are two basic types of salt formations used to store natural domes and beds. Salt domes are very thick salt formations. A salt dome formation might be a mile in diameter, 30,000 feet in height, and begin about 1,500 feet below the surface. The depth of the caverns that are hollowed out within the formation is critical for reasons of pressure and structural integrity. The pressure at which the gas can be stored is a function of the depth of the cavern. However, at extreme depths, as temperature and pressure increases, salt behaves as a plastic and will creep or flow, which can become a major consideration in cavern construction possibly leading to cavern closure. Thus, salt storage is generally limited to depths shallower than 6,000 feet. Accordingly, the art field is in search of a method of utilizing a low depth salt cavern to obtain an utmost benefit.

A salt bed storage site, on the other hand, is generally developed from a much thinner salt formation (less than 1,000 feet) located at shallower depths. As a result, the height-to-width ratio of the leached cavern is much less than with dome reservoirs, which are relatively high and narrow. Salt bed storage formations also contain much higher amounts of insoluble particles (shale and anhydrite rock) than salt dome formations. These materials remain in the reservoir after the leaching process and affect the flow velocity and capacity of the reservoir itself. In addition, because the height/width aspect is thin, the flatter reservoir ceiling is subject to greater stress and potential wall deterioration. As a result of these as well as other factors, salt bed storage development and operation can be more expensive than that of salt dome storage.

The term salt formation, as used herein, refers to both salt bed and salt dome storage facilities.

A salt formation storage facility is prepared by injecting water (leaching) into a salt formation and shaping a cavern. The deliverability rates of a salt formation are high because a salt formation reservoir is essentially a high-pressure storage vessel (that is, an underground tank). Base gas requirements are low (25 to 40 percent). On average, salt formation storage is capable of multiple cycling of inventory per year, in comparison to the typical one cycle or less for depleted gas/oil field and aquifer storage. As such, salt formation storage is well suited for meeting large swings in demand. However, prior art method of utilizing salt formations have required using compressors to compress natural gas to high pressure within the storage facility. As a result, often expensive and time consuming compression, heating/cooling and energy costs have been required to use the storage facilities. Accordingly, the art field is in search of a method of use of a salt storage facility that obtains a maximum benefit of the salt formation storage facility.

Further, a salt cavern site occupies a much smaller area than an oil or gas reservoir. On average, the amount of acreage taken up by a depleted gas/oil field reservoir is more than a hundred times the amount of acreage taken up by a salt dome. Consequently, a salt cavern storage operation is generally easier to monitor than a gas/oil field reservoir operation made up of many wells. Development time is also much less for salt formation storage than for gas/oil field reservoirs. On average, it takes about 18 to 24 months to develop a salt reservoir while a gas/oil field reservoir takes 24 to 36 months. Thus, a new salt formation storage site may begin to pay off sooner than a gas/oil field reservoir. Accordingly, the art field is in search of a method of use of a salt storage facility to assist in maximizing a pay off of the developmental costs.

For the same working gas capacity, new salt formation storage reservoirs are also capable of yielding much greater revenues for a heating season than conventional gas/oil field reservoirs. However, present methods of use for salt formations are limited to generally about one turnover per season. A generally large percentage of the salt storage facilities exist in the southern states of the U.S., but because of the many benefits of a salt formation, plans are underway in the midwest and northeast to develop such salt storage facilities. These facilities would augment directly the operations of nearby gas distribution companies. Accordingly, the art field is in search of a method of utilizing such salt formations to obtain a maximum benefit of the salt storage facility.

An most important characteristic of an underground storage reservoir is its capability to hold natural gas for future delivery. The measure of this is called working gas capacity: the amount of natural gas inventory that can be withdrawn to serve customer needs. In addition to working (top storage) gas, underground storage reservoirs also contain base (cushion) gas and, in the case of depleted oil and/or gas field reservoirs, native gas. Native gas is the gas that remains after economic production ceases and before conversion to use as a storage site. Upon development of a storage site, additional gas is injected and combined with any existing native gas in order to develop and maintain adequate storage reservoir pressure to meet required service. The resulting (permanent) inventory is referred to as the base or cushion load. During heavy demand periods, some base gas may be withdrawn temporarily and delivered as working gas, but over the long term, base levels must be maintained to ensure operational capability.

Natural gas is one of the most plentiful natural resources in North America and the reserves of the U.S. and Canada are enough to supply this continent well into the next century. However, the need for natural gas storage and violent supply swings arises because the demand for natural gas during the winter months exceeds the nation's production capacity, particularly in the Upper Midwest and Northeast. The U.S. consumes considerably more gas than it can produce during winter months because the interstate pipelines which transport natural gas from producing gas and storage fields in the Gulf Coast and the nations production regions to the market regions of the U.S. often do not have the capacity to transport the amount of natural gas needed during the peak demand periods, resulting in localized shortages of natural gas in the upper Midwest and Northeast U.S. Accordingly, the art field is in search of a method of transporting and storing natural gas that allows for a greater flexibility during peak demand periods and peak over supply periods.

Additionally, when the pipelines are loaded to their maximum capacity a bottleneck is formed in these pipelines as it is impossible to get additional gas into the pipelines until some of the gas has been consumed along the way. After some of the gas has been consumed, pipeline capacity opens up again and more gas can be placed into the system. Natural gas storage fields located to the north or downstream of this bottleneck have here-to-for been the only solution to this problem. Accordingly, the art field is in search of a method of utilizing natural gas storage for overcoming the bottleneck problems currently experienced by end consumers, suppliers and others.

As is common with natural gas, periods throughout the year are varying in regards to usage. During certain periods of the year usage may be higher than other periods of the same year. However, a gas pipeline only has a maximum capacity. Once the maximum capacity is reached in the pipeline, no more gas may be added to the pipeline. To further complicate matters, gas supply sources are commonly concentrated only in certain portions of an area. For instance, gas supply is most common in the southern portion of the U.S. Accordingly, the natural gas must be transported to other portions of a country or region to be used.

A major problem encountered with natural gas pipelines is when demand exceeds the supply of the pipeline. During the winter months of a year, natural gas will be depleted from the pipeline at a rapid pace in the Northern portions of a country where winter months require heating. The suppliers of natural gas can attempt to produce more gas to fill the pipeline, but this requires more time and effort. The prior art has tried to solve this problem with supplies from the depleted fields, aquifers and salt formations into the pipeline, but often it is not enough and there are severe shortages and price swings of natural gas. Accordingly, the art field has sought a system and method of use to balance the periods of high use and high supply by having alternate sources from which to divert natural gas (diverting natural gas, as used herein, means either filling or removing natural gas from a natural gas storage facility).

Likewise, prior art high pressure storage facilities require compressors to force natural gas into the natural gas storage facilities, especially as the high pressure storage facilities become approach capacity. These compressors require tremendous amounts of energy, thereby raising the costs of storage. Likewise, when releasing the high pressure gas from the high pressure natural gas storage facilities, the gas must be decompressed as the flow enters the pipeline, thereby, again, raising the cost of the natural gas storage and retrieval operations. Therefore, the constant adjustments to the pressure of the gas both into and out of high pressure natural gas storage facilities decreases the flow of the natural gas. A decrease in flow both into and out of the natural gas pipeline makes it extremely difficult to make quick changes in the flow of natural gas in a gas pipeline. Changes would occur much more quickly if the flow rates both into and out of the natural gas storage facility were maintained high. Accordingly, the art field is in search of a method of utilizing natural gas storage facilities in a manner that responds quickly to a change.

One prior art solution is disclosed in U.S. Pat. No. 4,858,640 to Kauffman. This patent discloses a network to be supplied by coordinating removal of gas from the individual storage caverns at an originally high storage pressure to a minimum residual pressure which is still below the operating pressure in the consumer network. This patent uses a system of valves and compressors to store high pressure gas in storage caverns. This patent does not disclose a relatively shallow depth storage cavern that may be used at a storage cavern operating pressure that is nominally the pressure of a pipeline. Accordingly, the art field is in search of a method of use whereby a relatively shallow depth and low pressures gas storage facility may be used with an existing network.

SUMMARY OF THE INVENTION

The present invention generally relates to a shallow depth and low pressure gas storage facility(s) with high deliverability of injection and withdrawal over a wide pressure range, and related methods of use.

This summary is not intended to be a limitation with respect to the features of the invention as claimed, and this and other objects can be more readily observed and understood in the detailed description of the preferred embodiment and the claims.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

GENERAL AND DETAILED DESCRIPTION AND EMBODIMENTS FOR CARRYING OUT THE INVENTION

For purposes of the description of this invention, the terms "upper", "lower", "right", "left", "vertical", "horizontal", "top", "bottom", and other related terms shall be defined as to relation of embodiments of the present invention as it is shown an illustrated in the accompanying Figures. Further, for purposes of the description of this invention, the terms "upper portion," "lower portion," "top," "bottom," and the like shall be defined to mean an upper portion and a lower portion and not specific sections. However, it is to be understood that the invention may assume various alternative structures and processes and still be within the scope and meaning of this disclosure. Further, it is to be understood that any specific dimensions and/or physical characteristics related to the embodiments disclosed herein are capable of modification and alteration while still remaining within the scope of the present invention and are, therefore, not intended to be limiting.

As will be understood by those of ordinary skill in the art, the present invention provides a new and novel method of providing a natural gas to a pipeline and/or end user. Primary distinctions with this method over other methods in the art are that (1) embodiments of the present invention allow for very high flow rates both into and out of the shallow depth, low pressure natural gas storage cavern(s); (2) the flow rates can be equal both into and out of the cavern(s); the shallow depth, low pressure gas storage cavern(s) of the present invention allow for a rapid reversal of flow in a pipeline; (4) large pipe connection to pipeline system(s) allow for high flow rates in and out of the pipeline system(s); and, (5) others as will be discussed in greater detail in the following detailed description.

Figure 1A:
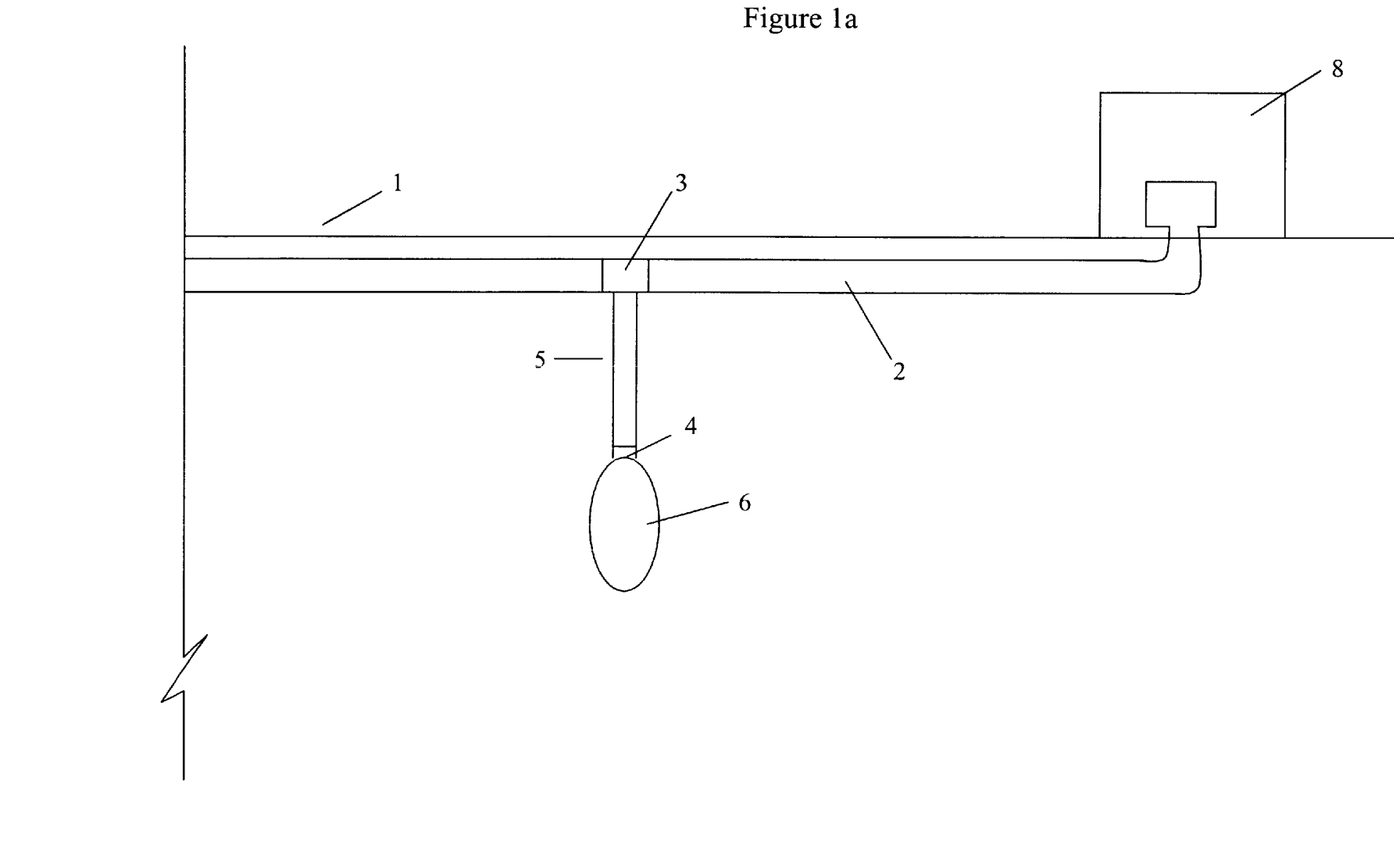
FIG. 1a is an illustration of an embodiment of the present invention utilizing a relatively shallow depth and low pressure gas storage facility.

Now referring to FIG. 1a, an illustration of an embodiment of the present invention utilizing a relatively shallow depth and low pressure gas storage facility, a single gas storage facility is illustrated. However, multiple caverns may be used and remain within the scope of the invention as will be more fully shown and explained with reference to FIGS. 2 and 3.

Surface 1 is illustrated as an upper surface with a pipeline 2 below surface 1. However, various other embodiments utilize a pipeline 2 that is above surface 1. As well, a body of water, such as a lake, pond, stream or sea, may be located bout pipeline 2 or above surface 1. Pipeline 2 may be a supply pipeline connected to a gas production facility (not shown). Various embodiments of the present invention incorporate an end user 8 connected to pipeline 2. Along pipeline 2 is a valve or joint 3 that is connected to a gas storage facility 6 by a path 5.

Gas storage facility 6 may be any storage facility or facilities common in the art, such as a depleted field, an aquifer, or a salt formation. As has been described herein, each different type of storage facility may be constructed by appropriate methods and manners that are common in the art. A gas storage facility or facilities of the present invention are characterized as shallow depth, low pressure gas storage facilities.

Gas storage facility 6 may be connected to a pipeline 2 by any method or path 5 common in the art such as piping or holes in the formation. In an embodiment, gas storage facility 6 is connected by a pipe with a valve 4 along a portion of path 5 that can control the flow of a gas into and out of a gas storage facility 6. Various embodiments also incorporate a valve or joint 3 about a pipeline 2 to control the flow of gas into and out of a pipeline 2. In an embodiment, the pipe connection to pipeline 2 is through a valve 4 and path 5 that are as large as path 5 to allow for an increased flow rate both into and out of pipeline 2.

While gas storage facility 6 is illustrated below pipeline 2, an actual orientation may be different. In an embodiment, a gas storage facility 6 is located adjacent pipeline 2, such that gas storage facility 6 is connected to pipeline 2 via piping or other methods common in the art. In another embodiment, a gas storage facility 6 is located within 10 miles of pipeline 2 and is connected as herein described.

As well, various embodiments of the present invention incorporate a compressor about gas storage facility 6 to aid in compressing of the contents of either pipeline 2 or gas storage facility 6. A compressor may be connected at any location between a gas storage facility 6 and a pipeline 2. Still, further embodiments of the present invention may incorporate a heater, dryer or cooler between a gas storage facility 6 and a pipeline 2 to aid in drying, heating or cooling of gas either being diverted from a pipeline 2 or being diverted from a gas storage facility 6.

As can be shown from the illustration of FIG. 1, end user 8 will have access to pipeline 2 and the contents thereof. In an embodiment of the present invention, end user 8 may have control of valve or joint 3 to divert a gas to and from pipeline 2. In another embodiment, an end user may contract with a gas storage facility to divert a flow of a gas from or to pipeline 2 from gas storage facility 6.

The present invention utilizes a gas storage facility 6 that has a portion at a depth of about 800 to about 1200 feet below a surface 1. Generally, a gas storage facility of the present invention may be categorized as having a top and a bottom, where the top is a portion of the gas storage facility closest to the surface of the earth and the bottom is a portion furthest from the surface of the earth. In an embodiment a top of a gas storage facility of the present invention is at a depth of between about 600 feet to about 1000 feet and a bottom is at a depth of between about 1000 feet to about 2000 feet. In another embodiment a top is at a depth of between about 400 feet to about 1200 feet and a bottom is at a depth of between about 800 feet to about 2500 feet. However, the present invention envisions a gas storage facility or facilities with a top and a bottom at any depth. A pressure of a gas within a gas storage facility 6, at capacity, is about the nominal pressure of a gas pipeline. Accordingly, a gas storage facility or facilities of the present invention is a shallow depth, low pressure gas storage facility.

Figure 2:
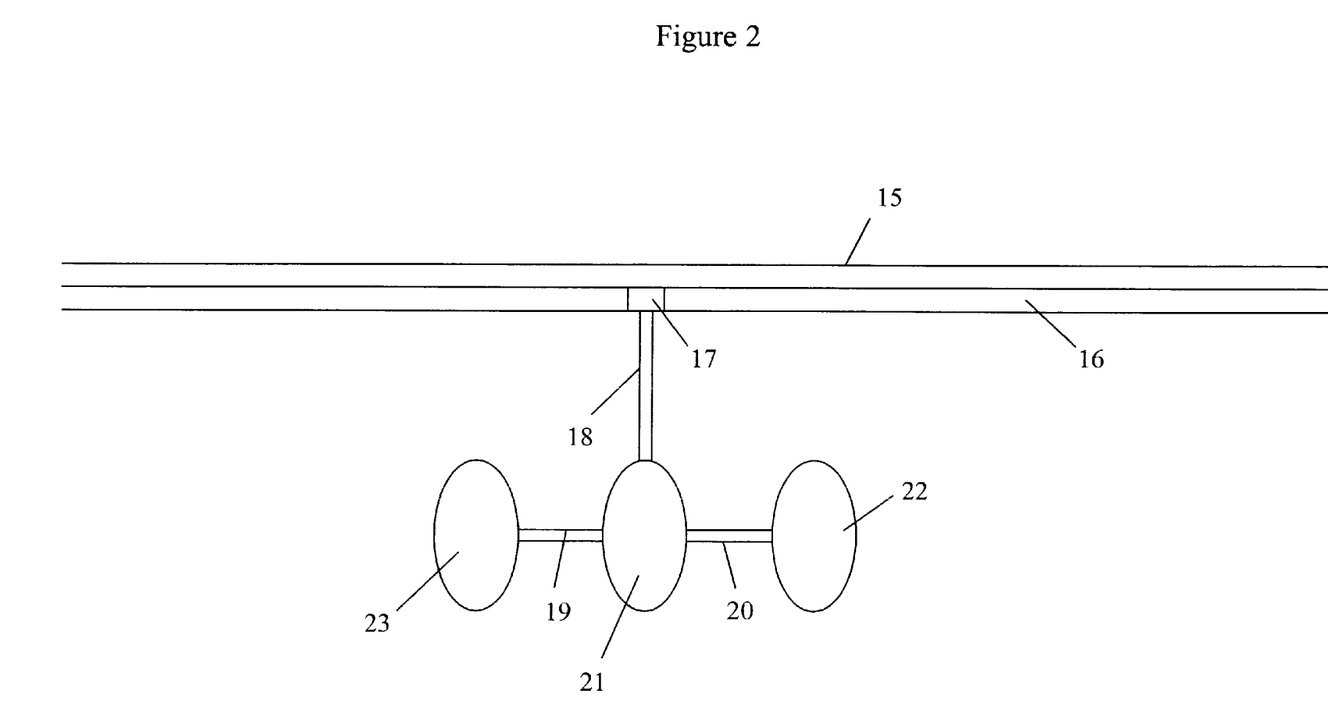
FIG. 2 is an illustration of an embodiment of the present invention whereby multiple gas storage facilities are connected in series.
Figure 3:
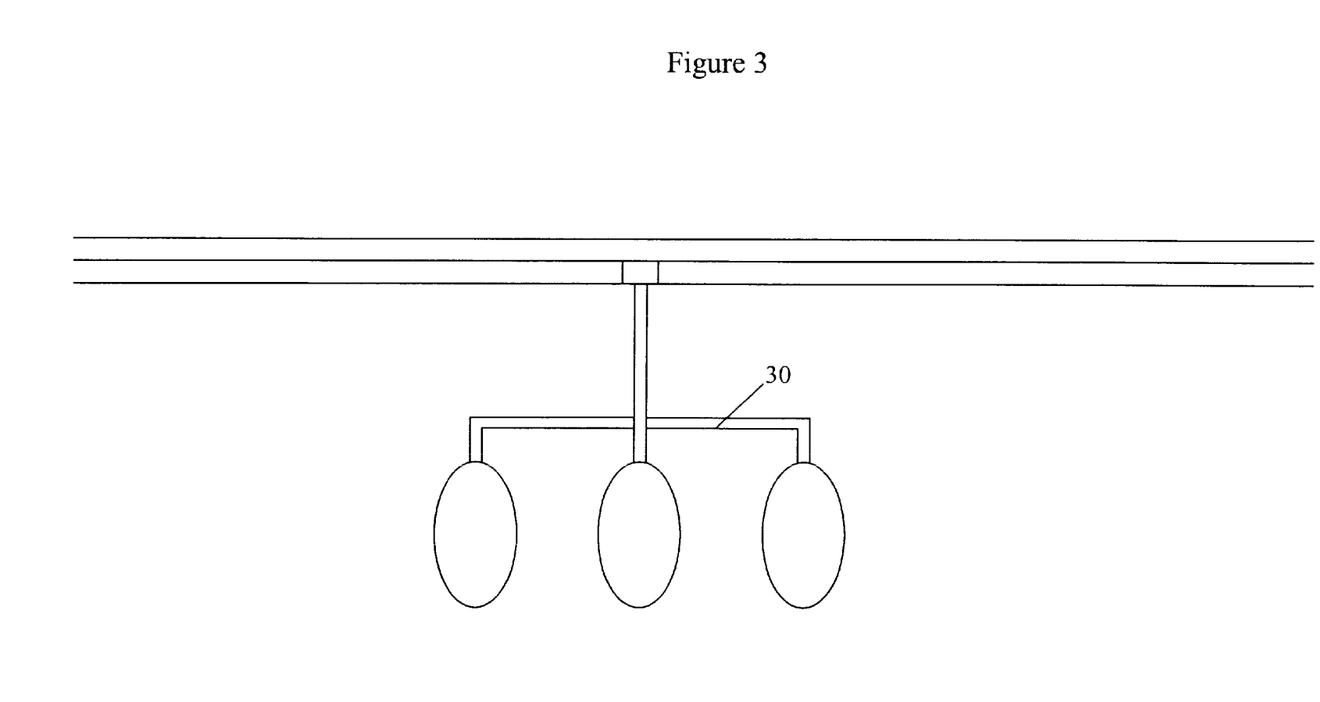
FIG. 3 is an illustration of an embodiment of the present invention whereby multiple gas storage facilities are connected in parallel.

Now referring to FIGS. 2 and 3, it may be seen that various embodiments of the present invention incorporate multiple gas storage caverns. In one embodiment, as can be seen from FIG. 2, multiple gas storage caverns are connected in series. In another embodiment, multiple gas storage facilities are connected in parallel. Various embodiments of the present invention incorporate the connection of any number of gas storage facilities. Likewise, various other embodiments include the connection of multiple gas storage facilities in a combination or multiple combinations of series and parallel connections of gas storage facilities of the present invention.

Figure 4:
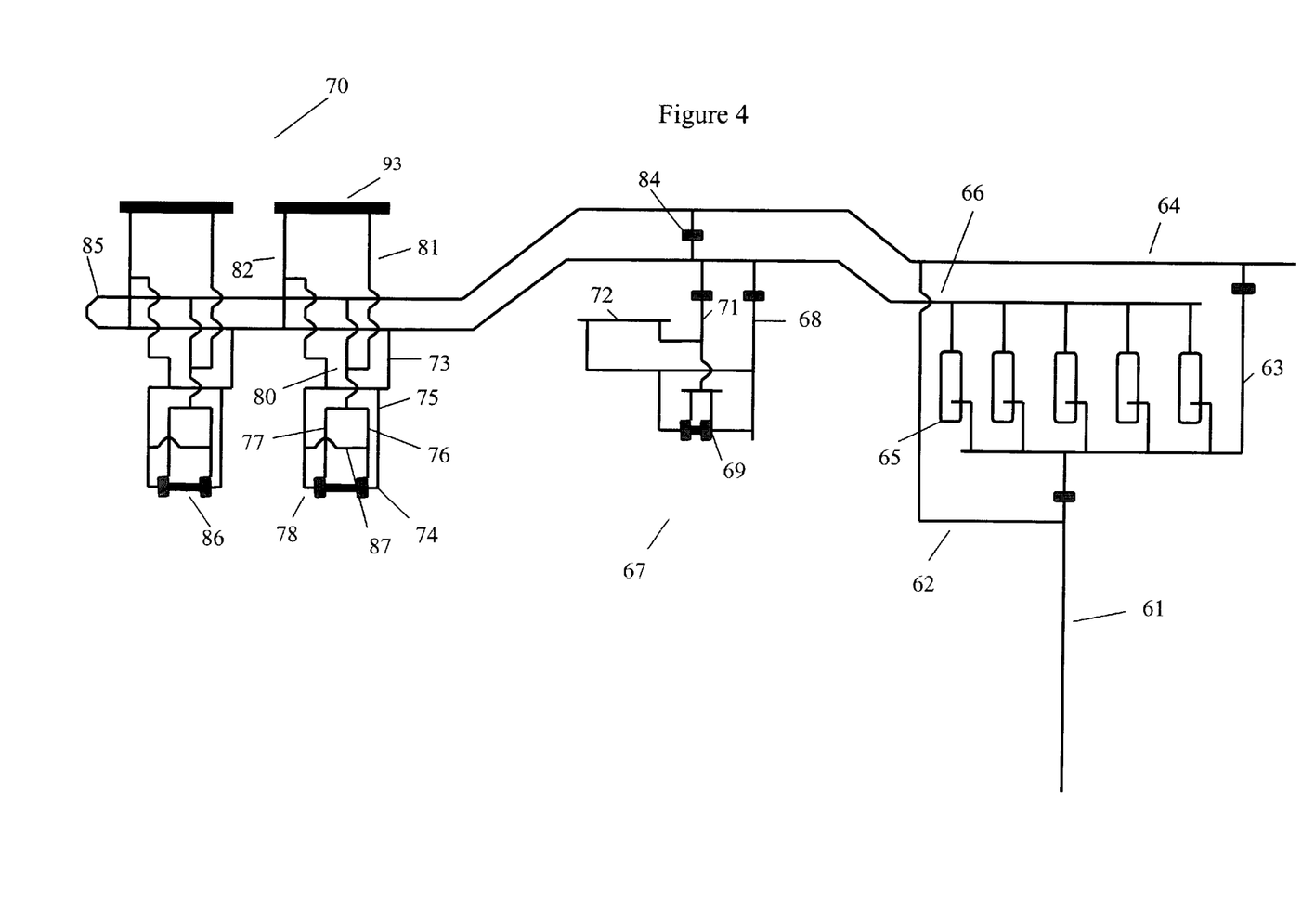
FIG. 4 is an illustration of an alternate embodiment of the present invention in an embodiment of a gas storage facility.

Now referring to FIG. 4, an illustration of an alternate embodiment of the present invention in an embodiment of a gas storage facility, a system 60 for use of and/or with various embodiments of the present invention is disclosed. A gas may be diverted by a compressor from a storage facility or facilities along a line 61. The gas compressed may be diverted to a gas pipeline 64 by lines 62 or line 63. In other embodiments, the gas compressed may be treated in treatment stations 65. The treatment may be any treatment common in the art, such as drying, heating, cooling, and the like. As in all embodiments of the present invention, various embodiments incorporate the use a connection to pipeline 64 that is very large, as previously described, to allow for high flow rates both into and out of pipeline 64.

The treated gas may then be passed in line 66 to compressor station 70. In various embodiments, a pre-compressor station 67 may be used. In embodiments utilizing a pre-compressor station 67, a portion of the gas or all of the gas may be diverted along a line 68 to compressor 69. Compressor 69 may be any pump and/or compressor common in the art, such as a single side or a dual side compressor. In an embodiment, compressor 69 is a MOPICO gas compressor with multiple modes, such as series, parallel, and/or the like, the operation of which will be discussed more fully below. However, any pump/compressor common in the art may be used. Pre-compressor station 67 may be used to increase the pressure, compression, flow, volume and/or the like of the gas before diverting it to compressor station 70. After treatment in pre-compressor station 67, the gas is diverted in line 71 back to line 66 where it may be diverted along line 84 or turnaround 85 to line 64 to a gas pipeline.

Other embodiments divert the gas to compressor station 70. Compressor station may incorporate any number of compressors 74. In the embodiment illustrated, two (2) compressors are illustrated, compressors 74 and 86. For ease of description, reference will be directed to compressor 74 and its operation. However, various other embodiments may utilize other similar compressors or different compressors. Referring back to compressor station 70 and compressor 74, the gas may be diverted along line 73 to compressor 74.

Compressor 74 may be operated in a variety of modes. Compressor 74 is at least capable of operating in a series mode and a parallel mode. However, other modes common in the art may be utilized. A series configuration may be utilized when a high pressure of gas is required. A parallel configuration may be utilized when a high rate of flow is desired. Both sides of various embodiments of compressors of various embodiments of the present invention are capable of pumping/compressing a gas. An example of a compressor that is capable of use with both sides is a MOPICO compressor.

In a series configuration, gas may be diverted from line 73 to line 75 and into a right side of compressor 74. After the gas is compressed/pumped on right side of compressor 74, the gas may be diverted out line 76 to line 87. Line 87 may divert the gas to line 78 and into left side of compressor 74. After pumping/compressing, the gas may be diverted along line 77 to line 64 and to a gas pipeline. The use of compressor 74 in a series configuration will increase the pressure of the gas twice. Other embodiments may use more compressors arranged in series to increase the pressure of the portion of gas passed through compressor 74 or other portions of gas.

In another embodiment, compressor 74 may be configured in a parallel arrangement. In a parallel configuration, the gas may be diverted from line 66 to line 73 and into both line 75 and line 78. In this configuration, both right and left side of compressor 74 will compressor different portions of gas to line 76 and line 77 thereby increasing the volume of gas diverted to line 80 and to line 64 and a gas pipeline. Other embodiments may use more compressors arranged in parallel to increase the volume of the portion of gas passed through compressor 74 or other portions of gas.

Figure 6:
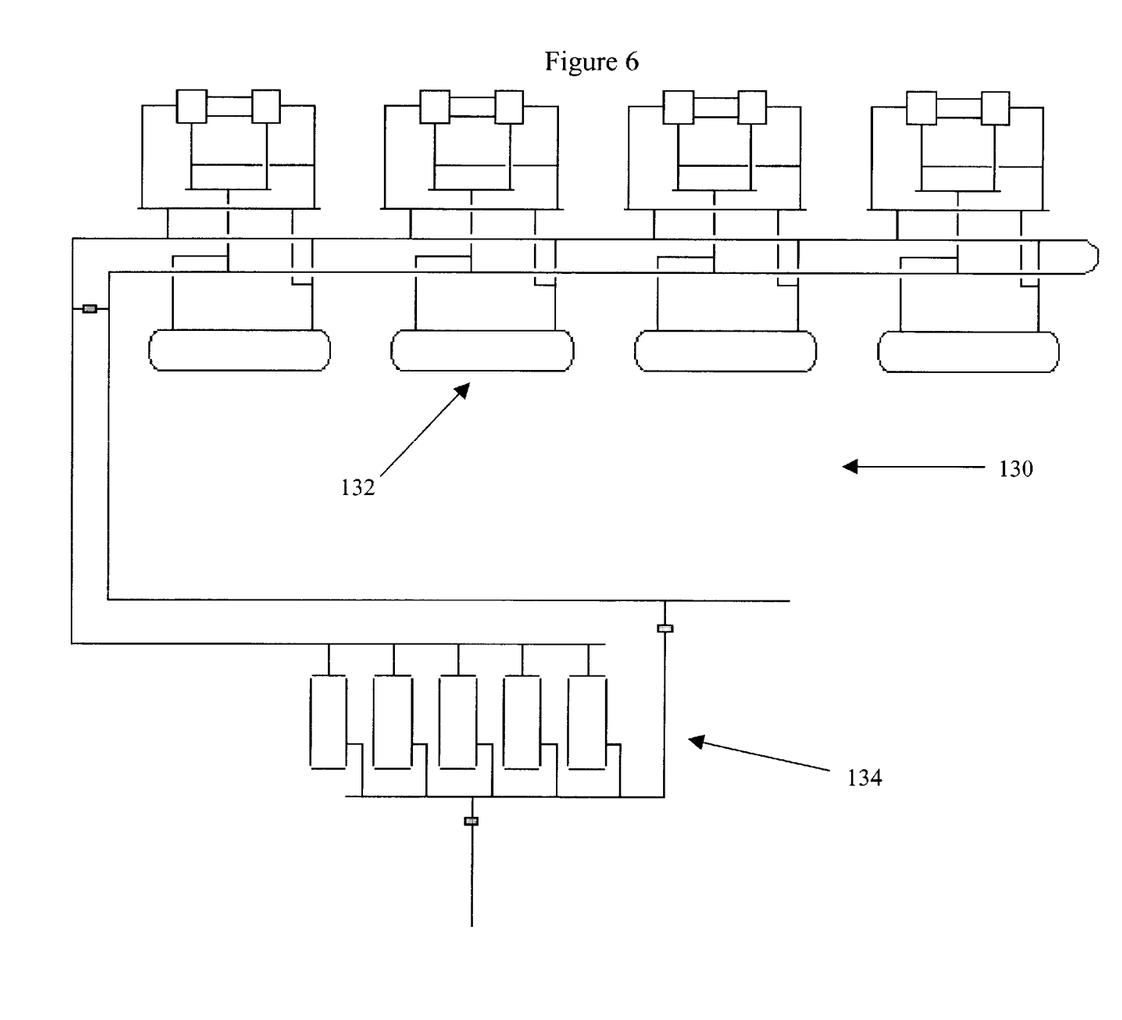
FIG. 6 is an illustration of an alternate embodiment of the present invention in an embodiment of a gas storage facility with four compressors.

Now referring to FIG. 6, an illustration of an alternate embodiment of the present invention in an embodiment of a gas storage facility with four compressors, the many and varying configurations of the present invention may be realized. This embodiment of compressor station 130 has a treatment station 134 and a compressor station 132. However, various embodiments, as in this embodiment, do not include a pre-compressor station. As well, it may be seen that a varying number of compressors may be used in different embodiments depending upon the amount of compression, volume, and/or the like as needed.

Figure 5:
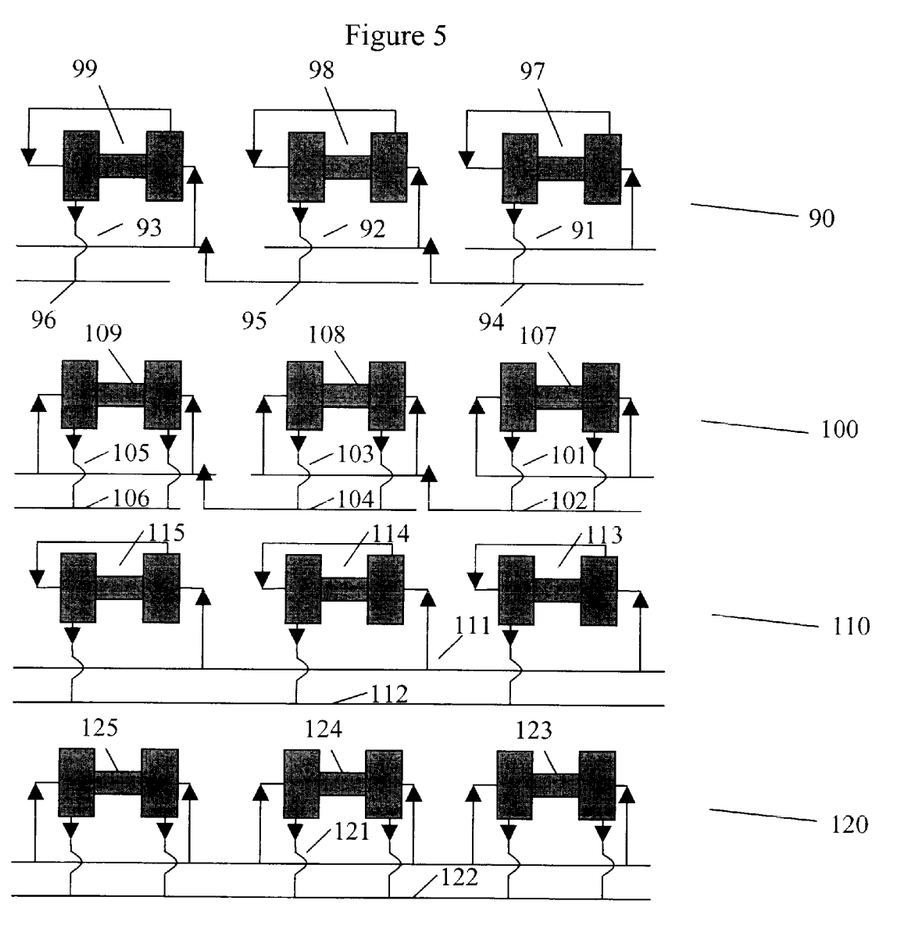
FIG. 5 is an illustration of an embodiment of an operation of multiple compressors in varying modes of operation of the present invention.

Now referring to FIG. 5, an illustration of an embodiment of an operation of multiple compressors in varying modes of operation of the present invention, various modes of multiple compressors are illustrated. Other embodiments may utilize multiple compressors, such as compressors 74 and 86. In an embodiment, compressor 74 and compressor 86. In an embodiment with multiple compressors, each compressor may be operated 90 in a series configuration with a gas supply 91. Gas in line 91 may pass though compressor 97; in series, to line 94, to line 92 to compressor 98; in series. Gas exiting compressor 98 may be diverted to line 95, to line 93 and to compressor 99; in series, and out line 96. In this embodiment, a maximum pressure may be obtained because the use of a gas supply and multiple compressors in a series configuration and a gas supply in series before diversion to a gas pipeline. In another embodiment, each compressor may be operated 95 in parallel configuration with a gas supply 101. Gas in line 101 may be diverted to compressor 107; in parallel, to line 102, to line 103 and to compressor 108; in parallel. Gas exiting compressor 108 may be diverted to line 104, to lie 105, and to compressor 109; in parallel, and out line 106. In this embodiment, an increased pressure and volume may be obtained from the use of compressors in parallel and a gas supply line to each compressor in series before diversion to a gas pipeline. In another embodiment, each compressor may be operated 110 in a series configuration with one gas supply 111. Gas supply 111 may be diverted to compressor 113; in series, compressor 114; in series, and compressor 115; in series and each individually out to line 112. In this embodiment, the pressure of the gas supply may be increased before diversion to a gas pipeline. In another embodiment, each compressor may be operated 120 in parallel with one gas supply 121. Gas supply 121 may be diverted to compressor 123; in parallel, compressor 124; in parallel; and compressor 125; in parallel out to line 122. In this embodiment, a maximum volume of gas may be compressed and diverted to a gas pipeline. However, various other modifications and arrangements, including the number of compressors, may be used and will be readily apparent to those of ordinary skill in the art.

Figure 7:
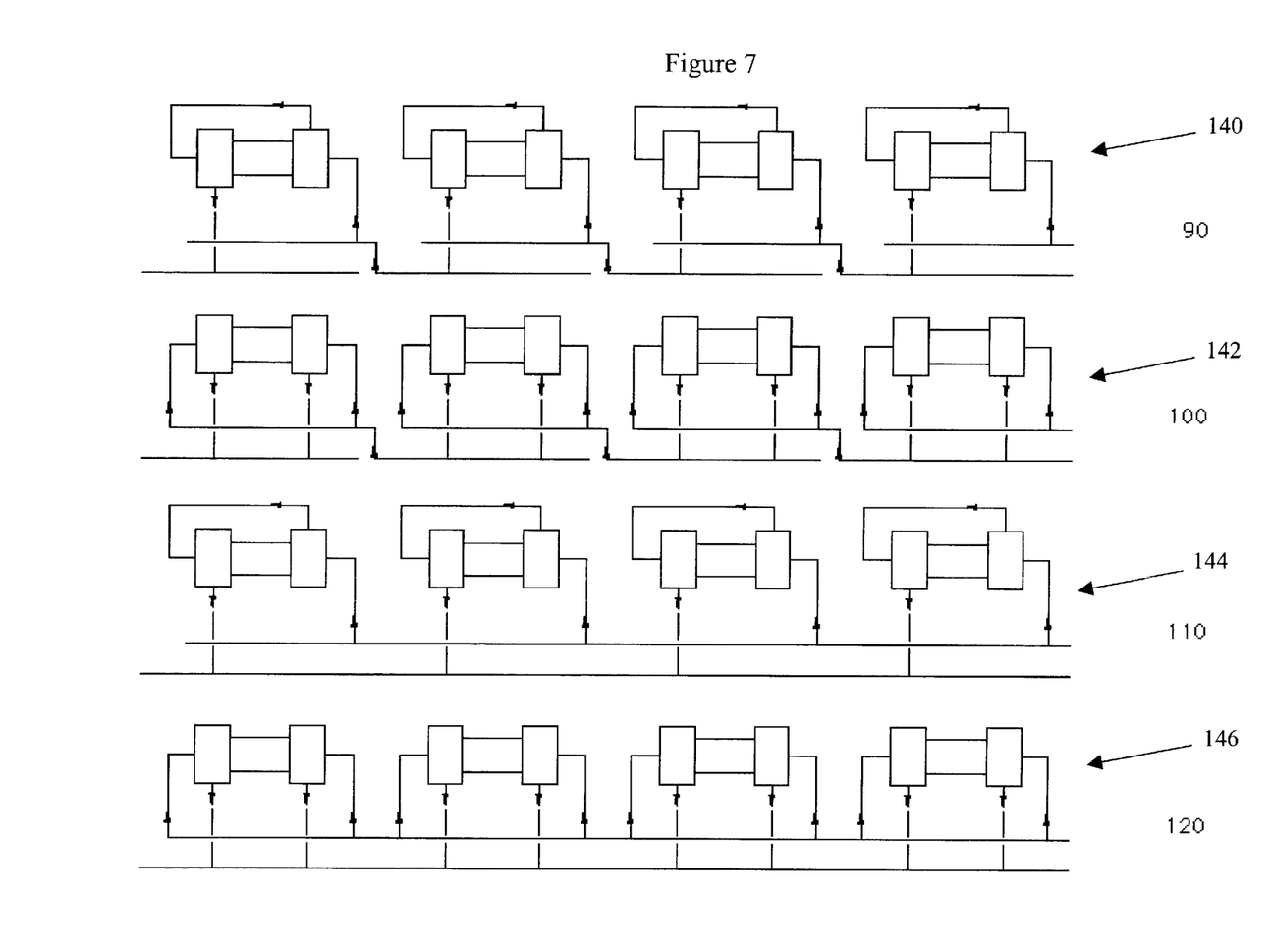
FIG. 7 is an illustration of an embodiment of an operation of multiple compressors in varying modes of operation of the present invention with four compressors.

Now referring to FIG. 7, an illustration of an alternate embodiment of the present invention in an embodiment of a gas storage facility with four compressors, the many modifications and alterations of the present invention may become apparent. Further, it may also be seen that various embodiments of the present invention can operate with any number of compressors depending upon a customers choice. Process 140 is four compressors connected in series and pumping in series for maximum pressure. Process 142 is four compressors connected in series and pumping in parallel. Process 144 is four compressors connected in parallel and pumping in series. Process 146 is four compressors connected in parallel and pumping in parallel.

Figure 8:
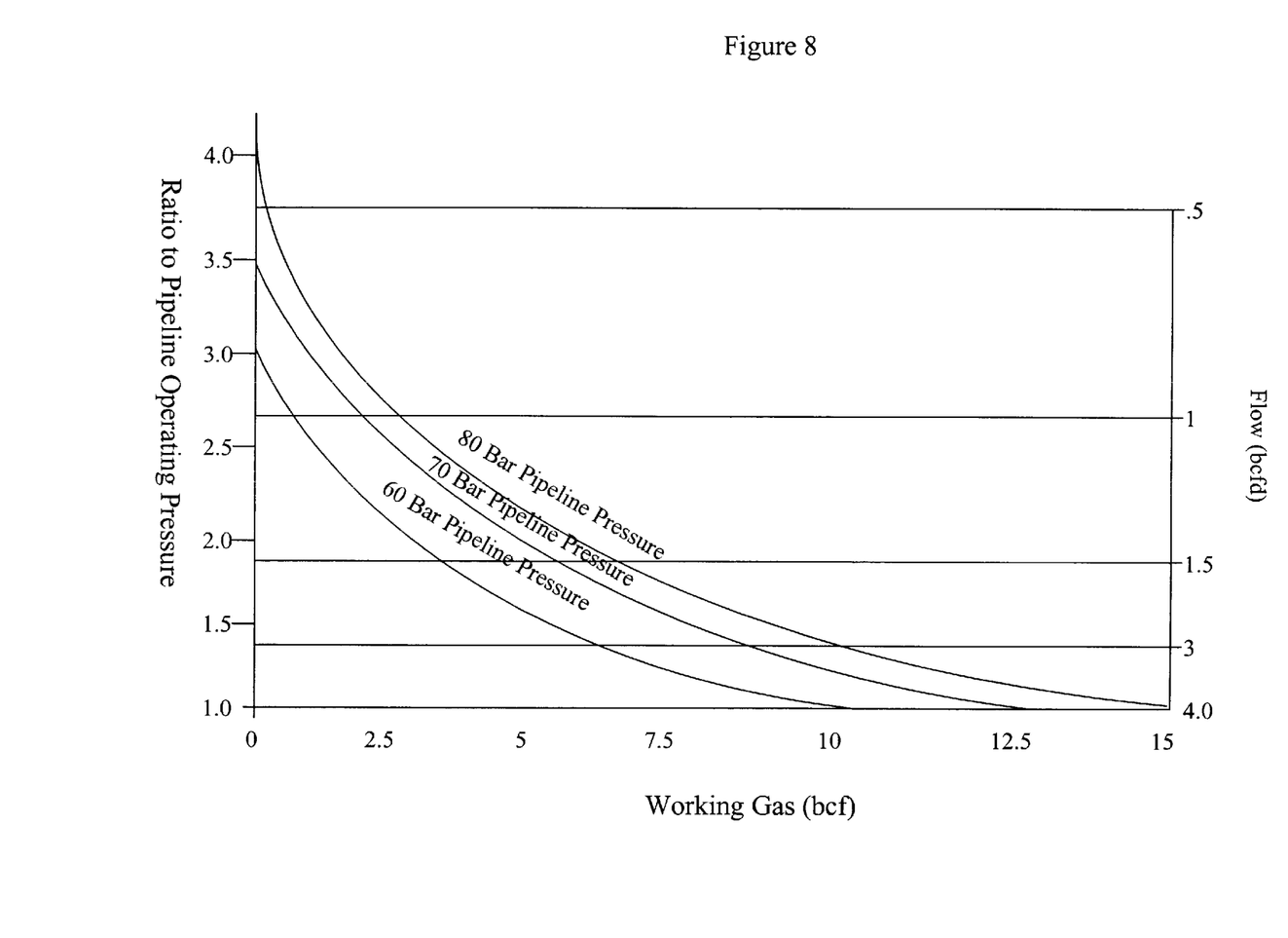
FIG. 8 is an illustration of a graph of ratios of pressure compared to a pipeline and flow of the gas to a volume of gas.

Now referring to FIG. 8, an illustration of a graph of ratios of pressure compared to a pipeline and flow of the gas to a volume of gas, the various improvements of various embodiments and methods of the present invention may be seen. The Figure illustrates that as the flow is increased from a gas storage facility or facilities, through a compressing configuration as heretofore described, a maximum volume of working gas may be diverted to a gas pipeline from a gas storage facility or facilities. As well, FIG. 6 illustrates that as the pressure of gas diverted from a gas storage facility is increased above about the nominal operating pressure of a gas pipeline, the volume of gas diverted from the gas storage facility or facilities is decreased.

Figure 1B:
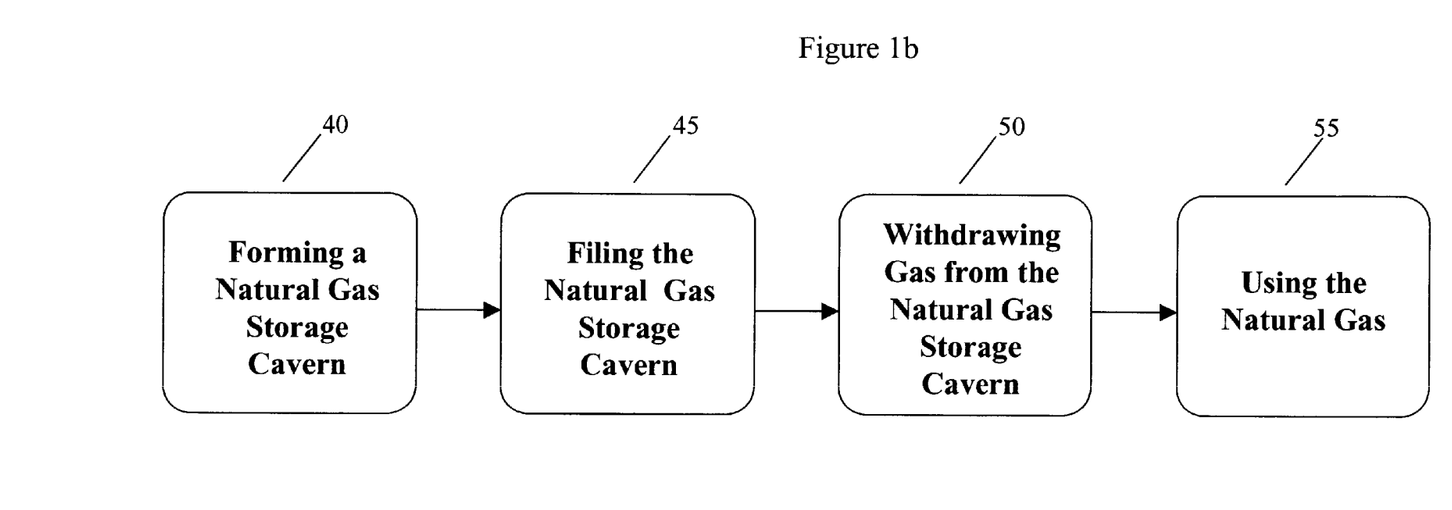
FIG. 1b is an illustration of a flowchart of an embodiment of a method of use of the present invention.

Now referring to FIG. 1b, an illustration of a flowchart of an embodiment of a method of use of the present invention, the general concepts of the present invention may be more easily seen. Generally, various embodiments of the present invention incorporate the forming and connection of a gas storage facility to a gas pipeline 40; a filling of a gas storage facility 45; a withdraw of gas from a gas storage facility 50; and using a gas from a gas storage facility 55. However, the various steps recited herein above are not sequential and may occur in any variety of orders and arrangements. Moreover, various embodiments of the present invention may be used for the treatment of a gas for any variety of reasons, such as adjusting the specification of the gas to meet an end users requirement, compressing a gas, storing a gas, and/ors the like.

Generally, as an overview, an embodiment of the present invention incorporates the use of shallow depth, low pressure gas storage facility in connection with a pipeline. The facility acts as a repository or storage vessel for a gas. The gas storage facility or facilities may be at least a portion filled with gas or may be at least a portion empty of gas.

In one embodiment of a method of utilizing a shallow depth, low pressure gas storage facility or facilities is when demand is high and gas usage may begin to deplete a supply of gas in a pipeline. Gas may be diverted from a shallow depth, low pressure gas storage facility or facilities into the pipeline to build pressure, build volume or line pack for expected heavy uses. In one embodiment, a user would open a valve or line from a pipeline to a shallow depth, low pressure gas storage facility and, if a pressure of the gas in the pipeline is below the pressure of the storage facility, the gas would flow from the gas storage facility at a high rate until the pressure of the pipeline was about equal to the pressure of the gas storage facility. Other embodiments incorporate a compressor along a portion of the connection between the facility and the pipeline to force gas into the pipeline for use as a line pack.

Other embodiments of the present invention incorporate a user contracting with a third party storage facility to store or supply gas from the gas storage facilities or facility as needed. In the various embodiments of a third party controlling the gas storage facilities, the facility or facilities may be used as a trading tool, a form of trade or currency exchange such as an arbitrage, a direct gas feed from a storage facility to a user without passage through a pipeline, and other methods and manners of use common in the art.

In another embodiment, when supply is high in a gas pipeline and/or when a bottleneck may result in a portion of a pipeline and the like, gas may be diverted into the gas storage facility or facilities from the pipeline for a later use. This becomes extremely valuable to a user who has purchased a certain quantity of gas but is unable to use all of it. Instead of leaving the gas on the pipeline, the user may divert the gas to a gas storage facility or facilities for a later use, thereby storing the gas that the user may have already purchased and not wasting the gas by leaving the gas on the pipeline.

An embodiment of a shallow depth, low pressure gas storage facility of the present invention has a high flow rate of the gas both into and out of the gas storage facility because the gas storage facilities are at a shallow depth and a low pressure no external compression of the gas is required to fill the storage facility (the storage facility is at a nominal operating pressure of a gas pipeline). High flow rates allow users of a shallow depth, low pressure gas storage facility or facilities to make many changes and adjustments to the flow of a gas in a gas pipeline. In one embodiment, a user may make a decision to divert gas from a pipeline and into a shallow depth, low pressure gas storage facility As well, high pressure gas storage caverns, i.e. gas storage facilities at pressures that are far above the operating pressure of the gas pipeline, require added expense before using the gas because compressed gas generates heat and cooling depending on the direction of flow, thereby requiring the use of heaters and coolers to adjust the temperature of the gas prior to use. Therefore, the use of high pressure gas storage caverns have many disadvantages that increase the cost of the gas storage and retrieval operation. Accordingly, the art field has searched for a method of utilizing a storage facility whereby an overall cost of storing the gas and retrieving the gas is reduced.

Utilization of a shallow depth, low pressure gas storage facility allows for high flow rates both into and out of the gas storage facility or facilities because the gas may not need to be compressed and/or the compression if required will be less than the compression required of a high pressure gas storage cavern. Pressures of the gas storage facility or facilities of the present invention are about at nominal pipeline operating pressures. Operating a gas storage facility or facilities at shallow depth and at about nominal pipeline operating pressures may be about 1000 pounds per square inch. Other embodiments may use varying pressures.

One embodiment of use for a shallow depth, low pressure gas storage facility or facilities is in controlling gas inventories. End users are often required to purchase certain quantities of gas for a specified time or period, sometimes referred to as a take or pay system. At times when actual usage of the gas is less than the amount of gas purchased this results in excess gas remaining on the pipeline and the end user being required to pay for more gas than was required for that period. In an embodiment of the present invention, in a gas storage facilities or a facility, a user may divert a portion of gas on a pipeline to a gas storage facility or facilities, thereby storing the gas already purchased and not wasting the gas or leaving the gas on the pipeline.

Another common problem encountered with gas pipelines is that there is often not enough gas on the pipeline to supply the end users, requiring them to pay excessive prices to have extra gas compressed on the pipeline from extra or excess supply from other sources. In an embodiment of the present invention, end users could release gas from a gas storage cavern to supplement the supply of gas on the pipeline. In another embodiment, a gas storage facility may directly divert the gas to the user from a gas storage facility.

A gas storage facility or facilities of the present invention are particular efficient for use with balancing operations which may be required in any increment of time or continuous as regulations require. Balancing operations are operations to match the physical and contractual requirements to the input or delivered gas in the pipeline system. In an embodiment of the present invention, a pipeline operator or controller may divert a gas from or to a gas storage facility or facilities to balance the pipeline. Various embodiments of balancing the gas pipeline may include both the addition of gas from the gas storage facility or facilities and/or withdraw or removal of gas from the gas pipeline.

Other embodiments of the present invention may use a gas storage facility as a hub or central repository. Low pressure high volume storage can be used to create a gas trading hub because it has the physical ability to handle large movements of gas in & out of storage, and to create a physical balancing point for a natural gas system. Further, low pressure high volume storage also has the ability to create a contractual point at which gas trades, puts, calls, transportation commitments and other contracts, can be reconciled. In the prior art the Hub concept has been primarily a point where various pipelines have been aggregated, the new invention replaces this multiple pipeline aggregation point with a hub having many more capabilities, including all applications as disclosed herein.

Other embodiments of the present invention may use a gas storage facility that is located on or near the physical location of the user, or which is directly connected to a user. In one embodiment, a gas storage facility may be used as a supply of gas directly to a facility such as a power generation plant, manufacturing process, a liquid natural gas (LNG) facility, and/or the like. As well and/or in addition, a gas storage facility or facilities of the present invention may be used for start-up operations after a shut down. The gas storage facility or facilities would supply pipeline operating pressure gas at a high flow rate for a sufficient period of time for startup. The amount of gas required for startup could be computed and an appropriate number and size of shallow depth, low pressure storage caverns of the present invention can be constructed. After starting the user's facility, the supply may be switched to a gas pipeline. The formation of the facility(s) can be customized to each users requirements.

Gas storage facility(s) of the present invention may be used with LNG storage facility(s) to improve the economics of the LNG facility. LNG facilities are common in the art and it is known that a majority of LNG facilities require refrigeration and/or cost of compression. In various embodiments, a gas storage faciltiy(s) of the present invention may be used for storage of LNG and/or its expanded state.

For example, it is common in the art for ships sailing across the sea to carry large containers of LNG. When these ships reach port, the containers are off-loaded and stored until use, shipping, and/or the like. Much of the time, these containers and/or other vessels are left for extended periods of time. These extended periods of time substantially raise the costs of storage and shipping of the LNG. Solutions to the problem have generally included off-loading and/or emptying the vessels into storage caverns. However, these storage caverns require the same procedures as the caverns heretofore mentioned, such as heating, cooling, compressing, and/or the like. However, the use of embodiments of the present invention would allow for an increased efficiency of operation. By converting at least a portion of an LNG to natural gas and storing this gas in a storage facility(s) of the present invention, a portion of the cost of storage is reduced, such as refrigeration and the like. As mentioned, the shallow depth, low pressure gas storage caverns of the present invention have a high flow rate both in and out, therefore, allowing loading and unloading of an LNG vessel at a steady flow rate thus increasing operating capacity of the LNG facility(s). Further, the storage facility (s) of the present invention may be used to supply peak load demands for the LNG facility(s).

As well, other embodiments of the present invention may use a gas storage facility or facilities that is located on or near the physical location of the user, or which is directly connected to the user, for maintenance of a user's facility during an operational shutdown, whether planned or not. A gas storage facility or facilities of the present invention would provide an isolated supply of gas to the user without the necessity of connection to a gas pipeline during the operations of a shutdown, such as maintenance, connection of new units, testing, and/or the like, thereby increasing safety and reducing chances of problems commonly encountered with the use of gas from a gas pipeline.

While general embodiments have been herein shown and described various other embodiments and uses will become readily apparent to those of ordinary skill in the art and are intended to be fully covered by the following claims. For example, while gas has been referred to as a gas of use in a storage facility, any kind of gas may be used and is contemplated to be within the scope of the claims.

As to the manner of operation and use of the present invention, the same is made apparent from the foregoing discussion. With respect to the above description, it is to be realized that although dimensional embodiments of specific material is disclosed, those enabling embodiments are illustrative, and the optimum dimension relationships for the parts of the invention are to include variations in composition, form, function and manner of operation, assembly and use, which are deemed readily apparent to one skilled in the art in view of this disclosure, and all equivalent relationships to those illustrated in the drawings and encompassed in the specifications are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention.

While the foregoing is directed to various embodiments of the present invention, other and further embodiments of the invention may be devised without departing from the basic scope thereof, and the scope thereof is determined by the claims which follow.

What is claimed is:

1. A method for enhancing the operation of a gas pipeline comprising the steps of:
   connecting a gas storage facility having a given operating pressure to a gas pipeline having an operating pressure which is nominally the same as said given pressure; and,
   monitoring a pressure of gas in the gas pipeline such that when the supply of the gas is greater than the demand for the gas, a gas purchaser may divert a portion of the gas in the gas pipeline to the gas storage facility from the gas pipeline and when the demand of the gas is greater than the supply of the gas, the gas purchaser may divert a portion of the gas from the gas storage facility into the gas pipeline.

2. The method of claim 1 further comprising the step of forming the gas storage facility.

3. The method of claim 1 further comprising the step of filling the gas storage facility with the gas.

4. The method of claim 1 further comprising a compressor for diverting the gas.

5. The method of claim 4 wherein the compressor is a MOPICO gas compressor or compressor.

6. The method of claim 4 wherein the compressor is a centrifugal gas compressor.

7. The method of claim 1 wherein the gas storage facility is a depleted petroleum field.

8. The method of claim 2 wherein the facility is formed in a salt formation.

9. The method of claim 1 wherein the pressure of the gas storage facility is about at a pipeline operating pressure.

10. The method of claim 1 wherein the gas storage facility is at least a portion at a depth of about 800 to about 1200 feet below a surface.

11. The method of claim 10 wherein the surface is ground level.

12. The method of claim 1 wherein the gas to be diverted to the gas pipeline is heated.

13. The method of claim 1 wherein the gas to be diverted to the gas pipeline is dried.

14. The method of claim 12 wherein the gas is heated before it is diverted to the gas pipeline.

15. The method of claim 13 wherein the gas is dried before it is diverted to the gas pipeline 16. The method of claim 1 wherein the gas is cooled.

17. The method of claim 1 wherein the gas pipeline is connected to an end user.

18. The method of claim 1 further comprising multiple gas storage facilities in series.

19. The method of claim 1 wherein the gas storage facility is a salt formation.

20. The method of claim 1 further comprising multiple gas storage facilities in parallel.

21. The method of claim 1 wherein the gas is diverted with at least one compressor.

22. The method of claim 21 wherein the compressor is capable of multiple modes of operation.

23. The method of claim 22 wherein the multiple modes of operation include at least series and parallel modes of operation.

24. The method of claim 22 wherein the at least one compressor is multiple compressors.

25. The method of claim 24 wherein the multiple compressors are configured in series.

26. The method of claim 25 wherein a gas supply from the gas storage facility or facilities is in series.

27. The method of claim 25 wherein a gas supply from the gas storage facility or facilities is in parallel.

28. The method of claim 24 wherein the multiple compressors are configured in parallel.

29. The method of claim 28 wherein a gas supply from the gas storage facility or facilities is in series.

30. The method of claim 28 wherein a gas supply from the gas storage facility or facilities is in parallel.

31. The method of claim 1 wherein the gas storage facility or facilities further comprises a top and a bottom.

32. The method of claim 31 wherein the top of the gas storage facility or facilities is at a depth of about 600 feet to about 1000 feet.

33. The method of claim 31 wherein the bottom of the gas storage facility or facilities is at a depth of about 1000 feet to about 2000 feet.

34. The method of claim 31 wherein the top of the gas storage facility or facilities is at a depth of about 400 feet to about 1200 feet.

35. The method of claim 31 wherein the bottom of the gas storage facility or facilities is at a depth of about 800 feet to about 2500 feet.

36. The method of claim 31 wherein the connection of the gas storage facility or facilities to the gas pipeline is very large.

37. A method for an end user to facilitate rapid control of a gas inventory comprising the steps of:

providing a gas storage facility having a given operating pressure;

connecting the gas storage facility to a gas pipeline having an operating pressure which is nominally the same as said given pressure; and allowing selective accessibility by the end user to divert gas to and from the gas storage facility to the gas pipeline.

38. The method of claim 37 wherein the gas storage facilities are low pressure gas storage facilities.

39. The method of claim 37 wherein the gas in the gas storage facilities is about a normal pipeline operating pressure.

40. The method of claim 37 wherein the end user diverts the gas.

41. The method of claim 37 further comprising placing a compressor between the gas storage facility and the gas pipeline.

42. The method of claim 37 wherein the gas flow rates are about equal when diverted into the gas storage facility and when diverted out of the gas storage facility.

43. The method of claim 38 wherein the gas storage facility may be diverted to balance the gas pipeline.

44. The method of claim 37 wherein multiple gas storage facilities are connected in series.

45. The method of claim 37 wherein multiple gas storage facilities are connected in parallel.

46. The method of claims 44 and 45 wherein the pressures in the connected gas storage facilities are different.

47. The method of claim 37 wherein the end user is a power generation facility.

48. The method of claim 37 wherein the step of further allowing selective accessibilty further comprises at least one compressor.

49. The method of claim 48 wherein the at least one compressor is multiple compressors capable of operation in multiple modes.

50. The method of claim 49 wherein the multiple compressors are configured in series.

51. The method of claim 50 wherein a gas supply from the gas storage facility or facilities is in series.

52. The method of claim 50 wherein a gas supply from the gas storage facility or facilities is in parallel.

53. The method of claim 49 wherein the multiple compressors are configured in parallel.

54. The method of claim 53 wherein a gas supply from the gas storage facility or facilities is in series.

55. The method of claim 53 wherein a gas supply from the gas storage facility or facilities is in parallel.

56. The method of claim 37 wherein the connection of the gas storage facility or facilities to the gas pipeline is very large.

* * * * *